United States Patent [19]

Mowka, Jr.

[11] Patent Number: 5,484,525
[45] Date of Patent: Jan. 16, 1996

[54] FOAM FRACTIONATION PROTEIN SKIMMER ASSEMBLY

[75] Inventor: Edmund J. Mowka, Jr., Mentor, Ohio

[73] Assignee: Aquarium Systems, Inc., Mentor, Ohio

[21] Appl. No.: 274,255

[22] Filed: Jul. 13, 1994

[51] Int. Cl.$^6$ .............................. A01K 63/04; C02F 1/24
[52] U.S. Cl. ...................... 210/169; 210/221.2; 119/263; 119/264
[58] Field of Search .................................. 210/169, 221.2, 210/220, 416.2; 119/261, 263, 264

[56] References Cited

U.S. PATENT DOCUMENTS

| | | |
|---|---|---|
| 3,669,883 | 6/1972 | Huckstedt . |
| 3,772,192 | 11/1973 | Huckstedt . |
| 3,965,007 | 6/1976 | Conn . |
| 4,333,829 | 6/1982 | Walther . |
| 4,834,872 | 5/1989 | Overath . |
| 4,985,181 | 1/1991 | Strada . |
| 5,078,867 | 1/1992 | Danner . |

OTHER PUBLICATIONS

The Marine Aquarium Reference, copyright 1989, Martin A. Moe, Jr., pp. 273–287.
Captive Seawater Fishes Science and Technology, copyright 1992, Stephen Spotte, pp. 163–168.

*Primary Examiner*—Thomas M. Lithgow
*Attorney, Agent, or Firm*—Renner, Otto, Boisselle & Sklar

[57] ABSTRACT

A foam fractionation protein skimmer assembly/apparatus for removing organic waste material from water within an aquarium includes a foam fractionation column adapted to be partially submerged in the water in an aquarium and an aerating water pump which mixes air with water drawn from the aquarium internally within the pump and pumps the aerated water into the column through an external water intake port on the column to provide a downward flow of water in the column counter to air bubbles rising within the column to induce production of surfactant-containing foam on the surface of the water within the column. The column itself is comprised of a plurality of separate tube sections or chambers frictionally connected together for ease of assembly and disassembly to facilitate cleaning of the column.

25 Claims, 4 Drawing Sheets

FOAM FRACTIONATION PROTEIN SKIMMER ASSEMBLY

FIELD OF THE INVENTION

The present invention relates to a foam fractionation protein skimmer assembly especially for use in removing protein wastes and other organic deposits from aquariums.

BACKGROUND OF THE INVENTION

It is known to provide aquariums with a combination of mechanical, chemical and biological filtration to maintain water quality. The correct combination of these methods will remove most organic waste and help maintain a healthy environment within the aquarium.

Heretofore different types of organic deposits have been removed from aquariums utilizing foam fractionation induced within a column in which air bubbles injected into the water within the column collect hydrophilic molecules of surfactants and carry them to the water surface to create a removable foam. As is known in the art, many of the organic substances such as protein deposits within an aquarium are surface active polar molecules which will bond to the surface of bubbles. As the bubbles rise through the water, they carry the bonded surface active material with them to form a surfactant-containing foam at the water surface. If the foam on the surface of the water is stable, the water drains away therefrom and the foam and protein deposits contained therein are thus separated from the water and can easily be removed.

Effective foam fractionation cleansing of aquarium water depends upon the nature of the foam produced by the water/bubble counterflow in the contact column. The foam must have sufficient stability to allow the water to drain away from the foam formation at the water surface without draining away the surfactants. Foam drainability is affected by foam bubble size, viscosity, and surface tension. Foam stability requires that the film concentration of the surface layer be different from that of the water, and that the surface layer be of high viscosity. Small bubbles are more effective for adsorption of organic surfactants than larger ones for a given volume of air introduced into the water because of their greater cumulative surface area. However, the bubbles should not be so small that they are unable to break the surface tension at the air-water interface to form foam on the surface of the water. Optimal values of these factors result in a surface film concentration which is different from that of the bulk liquid (the water of the aquarium) and a high viscosity in the surface layer so that the collected impurities can be removed therefrom.

In one known foam fractionation skimming device, air is injected through a bubble-forming gas discharge device such as an air stone at or near the bottom of a column of water. The bubbles rise up through the column, collecting molecules of polar surfactants along the way, and congregating at or above the water surface to form a foam layer within the column which contains the surfactant molecules. A cup fitted on the top of the column collects the foam through a center opening and is then removed for cleaning. Water is drawn through the bottom of the column and carried upward within the column by the rising air bubbles and is discharged through other openings in the column wall. The foam fractionation produced by using an air line only to induce bubble and water flow through the column is limited by insufficient counterflow of water and bubbles.

In another known type of foam fractionation skimming device, water is drawn from a tank or aquarium and directed into a water column by a pump connected through the side of the column below the water surface. An air line is connected to an outlet of the pump so that the motion of the water pumped past the air line opening draws air into the pumped water flow by a quasi-venturi effect. The air drawn in by the pumped water flow creates bubbles in the water in the column which, after being carried toward the bottom of the column by the water flow, rise through the column to produce foam at the water surface within the column. The pumped water exits the column through an opening at the bottom of the column. The bubble formation in this type of skimmer is wholly dependent upon the venturi effect at the pump outlet/air line interface which is difficult to regulate to achieve optimum bubble size and quantity.

In still another known type of foam fractionation skimming device, the bottom end of the water column is closed and water is drawn down through the column and out through a water line exiting near the bottom of the column. A first bubble forming gas discharge device is provided adjacent the bottom of the column to create and propel bubbles up through the column. A second bubble forming gas discharge device is provided in the water line exiting near the bottom of the column to create a water flow in the column counter to the rising bubbles in the column. Such a device is also limited by insufficient counterflow of water and bubbles.

Other known foam fractionation devices or systems use a water pump having an air line connected to the pump outlet to direct an air/water mixture into the bottom of a column or tube. The pumped water leaves the column through side openings in the column and the air bubbles rise to the top of the water surface within the column. It is difficult to separately monitor and regulate the air and water flow rates in such systems to achieve an optimum counterflow for efficient protein skimming by foam fractionation.

SUMMARY OF THE INVENTION

The present invention provides a foam fractionation protein skimmer assembly or apparatus which creates a relatively high volume counterflow of water and air bubbles within an air/water contact column or tube to remove protein deposits and organic surfactants from the water by foam fractionation.

In accordance with one aspect of the invention, the foam fractionation protein skimmer assembly includes a foam fractionation column or tube partially submerged in a body of water and connected to an aerating water pump which mixes air with water drawn from the body of water internally within the pump and pumps the aerated water into the column to produce a downward flow of water counter to air bubbles rising within the column to induce production of surfactant-containing foam on a surface of the water within the column.

In accordance with another aspect of the invention, the foam fractionation protein skimmer assembly includes a foam fractionation column partially submerged in a body of water and connected to an aerating water pump which draws water from the body of water, aerates the water inside the pump according to a regulated amount of air supplied to the pump, and pumps aerated water into the column to create a downward flow of water counter to air bubbles rising within the column.

In accordance with another aspect of the invention, the foam fractionation protein skimmer assembly includes a foam fractionation column or tube partially submerged in a body of water in an aquarium or tank and connected approximately at the surface level of the body of water to a discharge nozzle of an aerating water pump which draws water from the body of water, aerates the water inside the pump, and directs the aerated water downward through the column to create within the column a counterflow of downward moving water and upward moving air bubbles to induce attachment of surfactants in the water to the rising bubbles to produce a surfactant-containing foam on the surface of the water within the column which is above the surface level of the body of water in the aquarium or tank.

In accordance with another aspect of the invention, the foam fractionation column includes an external water intake port in which the pump water discharge nozzle is inserted.

In accordance with another aspect of the invention, the pump water discharge nozzle terminates within the external water intake port on the foam fractionation column and has a water discharge opening therein of a width substantially equal to the inner diameter of the foam fractionation column to create a type of laminar flow in the column.

In accordance with another aspect of the invention, the foam fractionation column is comprised of a plurality of separate tube sections or chambers frictionally connected together for ease of assembly and disassembly to facilitate cleaning of the column.

In accordance with another aspect of the invention, the foam fractionation column includes a pump interface chamber having an external water intake port for receipt of the pump water discharge nozzle, a contact chamber removably attached to the bottom of the pump interface chamber, and a foam concentration chamber removably attached to the top of the pump interface chamber.

In accordance with another aspect of the invention, both the contact chamber and foam concentration chamber comprise a length of smooth wall clear cylindrical tubing, and the pump interface chamber has external stepped flanges on opposite ends which are tapered to provide a friction fit with the ends of the contact chamber and foam concentration chamber.

In accordance with another aspect of the invention, a foam collection cup is removably attached to the upper end of the foam collection chamber.

In accordance with another aspect of the invention, an end cap having a radially outwardly protruding discharge port is rotatably mounted on the lower end of the contact chamber to permit the water to be discharged from the bottom of the contact chamber in any desired direction.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
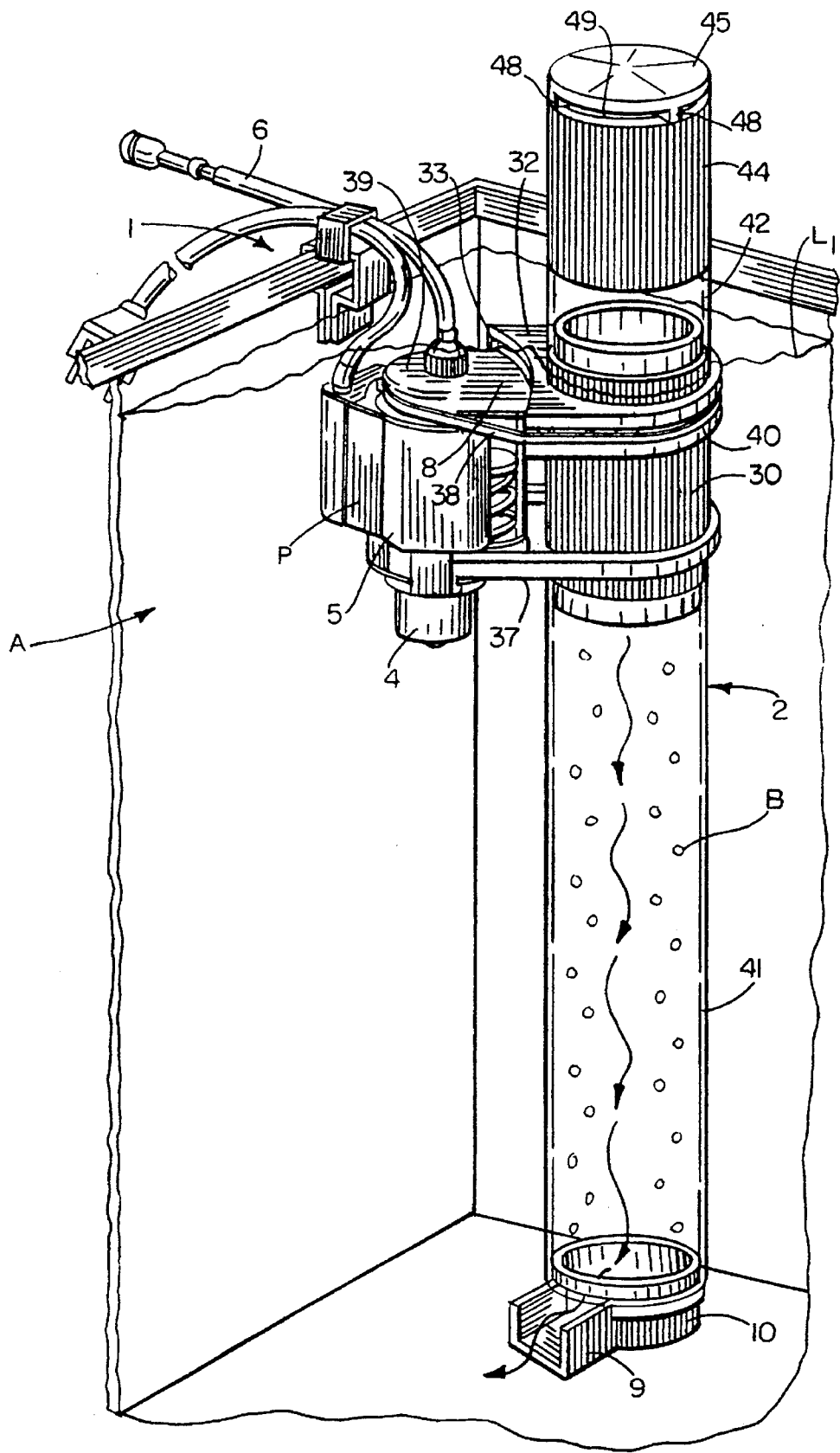
FIG. 1 is a schematic perspective view of a preferred form of a foam fractionation protein skimmer assembly in accordance with the present invention installed in an aquarium.
Figure 2:
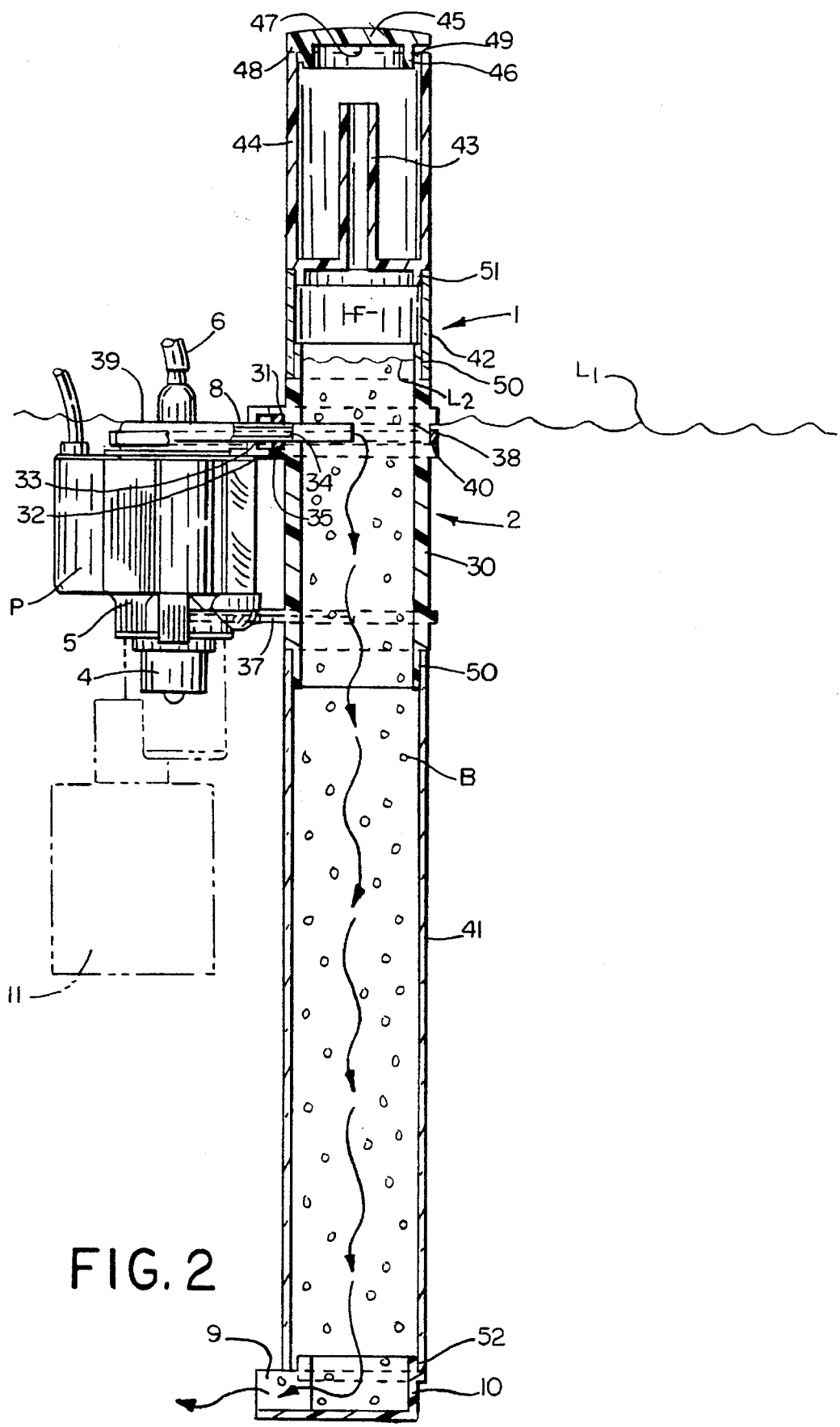
FIG. 2 is a longitudinal section through the contact column of the foam fractionation protein skimmer assembly of FIG. 1, the aerating water pump of the assembly being shown in elevation.

Referring now in detail to the drawings, and initially to FIGS. 1 and 2, there is shown a preferred form of foam fractionation protein skimmer assembly or apparatus 1 in accordance with the invention, which includes a centrifugal aerating water pump P connected to a hollow air/water contact column or tube 2 installed partially submerged in a body of water in a tank or aquarium A. Contact column 2 is desirably generally cylindrical but may be of other shapes or configurations suitable for insertion in a tank or aquarium, and in which a desired counterflow of water and air bubbles can be produced as described hereafter.

The centrifugal aerating water pump P is preferably of the type disclosed in U.S. Pat. No. 4,985,181, assigned to the same assignee as the present application, the disclosure of which is fully incorporated herein by reference. Water is drawn from the aquarium A by pump P through a water intake 4 into the pump body 5. Air supplied by an air line 6 connected to the pump is mixed with the water inside the pump, in the manner described in the '181 patent and further described below, and then discharged through an aerated water discharge nozzle 8 into contact column 2. A prefilter assembly 11 (shown in phantom lines in FIG. 2) may be attached to the water intake 4 of pump P to prevent large particulates, algae and aquarium animals from entering the pump.

During installation, the aerated water discharge nozzle 8 of pump P is initially positioned approximately at the surface $L_1$ of the water in aquarium A with the contact column 2 partially submerged in the water and the top of the contact column extending above the water surface $L_1$ as shown. The height of the contact column 2 can be adjusted relative to the water level in the aquarium to achieve the desired results as described below. As indicated by the serpentine directional arrows in contact column 2, the flow of water exiting from the pump discharge nozzle 8 into contact column 2 is generally downward, pushing oxygen-rich water down through the contact column and out through a radially outwardly extending side water discharge port 9 in a rotatably adjustable end cap 10 at the bottom of the column. By making the end cap 10 rotatably adjustable with respect to the contact column 2, the side discharge port 9 may be rotated 360° for directing the oxygen-rich water discharged from the contact column where it is most needed within the aquarium.

Because the water is freshly aerated upon exiting the pump P at the discharge nozzle 8, the water flow into contact column 2 includes many air bubbles B which are initially carried downward within the column by the water flow and then rise to the water surface within the column while the pumped water exits the bottom of the column. It is this counterflow of downward moving water and rising air bubbles within the contact column 2 that promotes the desired foam fractionation organic cleansing described below.

Figure 3:
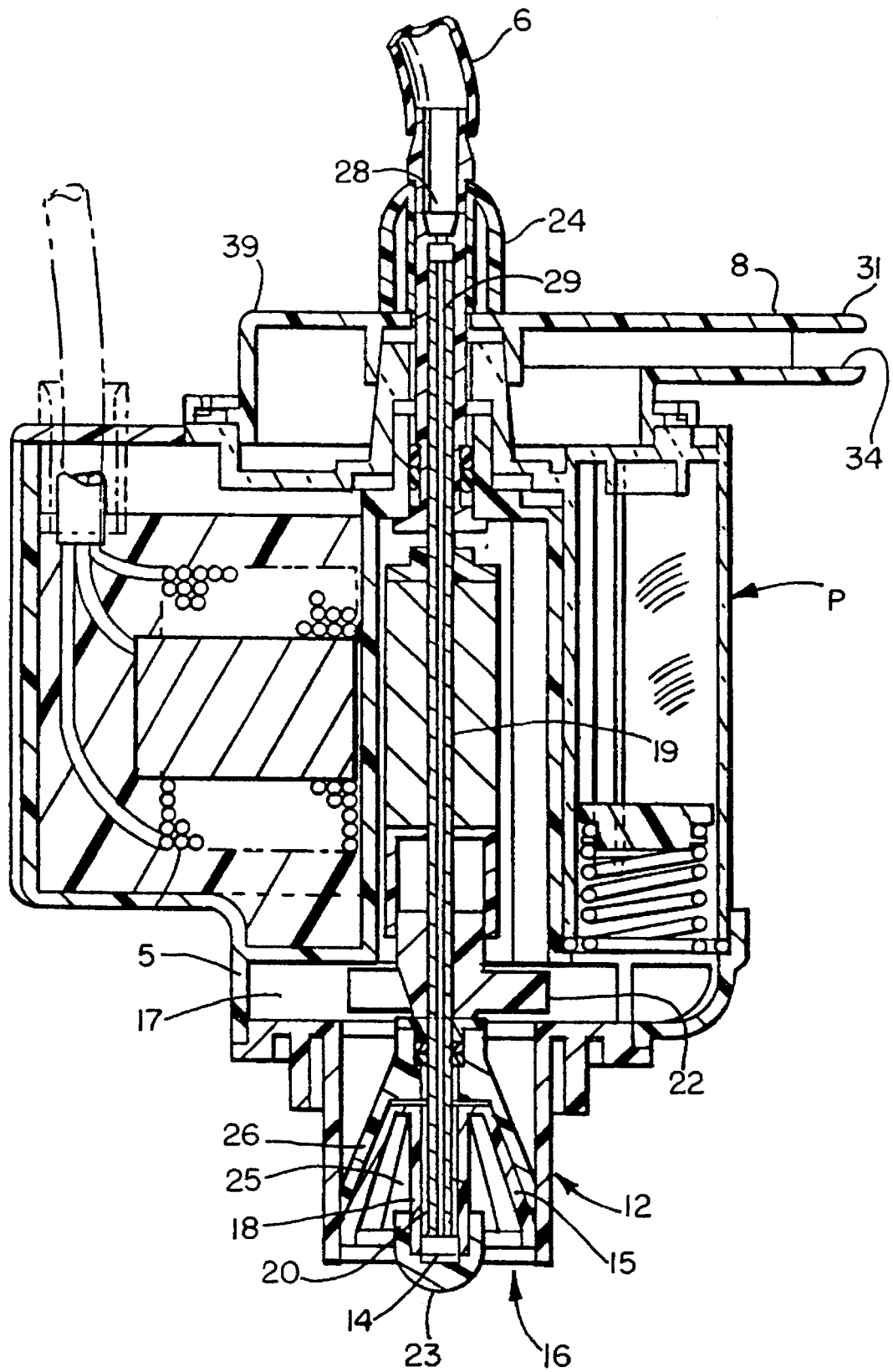
FIG. 3 is an enlarged longitudinal section through the aerating water pump of FIGS. 1 and 2.

With reference to FIG. 3, and as described in U.S. Pat. No. 4,985,181, the pump P includes a pump regulation valve 12 which may be adjusted to regulate the rate at which water is pumped into contact column 2, and correspondingly, the amount of air or oxygen drawn through air line 6 and mixed with the water inside the pump body. Pump regulation valve 12 includes a shutter portion 15 in a water inlet duct 16 to a cylindrical pumping chamber 17 for controlling the water flow rate through the pump. Shutter portion 15 includes a hub portion 18 secured to the bottom end of a hollow rotatable shaft 19. Hub portion 18 extends slightly below the bottom of hollow shaft 19 and has several small internal grooves 20 extending axially along the exterior surface of shaft 19 to the axial inner end of the hub portion 18 for directing air passing down through the shaft 19 from air supply line 6 attached to the upper end of shaft 19 toward the rotational axis of pump impeller 22. A cap 23 closes off the cavity 14 formed by the bottom of hub portion 18.

The flow rate of water through the pump P can be regulated by rotating a control knob 24 on the upper end of the shaft 19 to rotate the shutter portion 15 of valve 12 relative to flow passages 25 in a seat portion 26 of valve 12 disposed in water inlet duct 16. The valve shutters 15 are desirably substantially the same size as the flow passages 25 in seat portion 26 and have the same spacing therebetween, whereby rotation of the shutter portion 15 relative to the flow passages 25 will change the area of the flow passages left open by the shutters to change the quantity of water flowing through the passages. Because the internal grooves 20 in the valve hub portion 18 communicate with a low pressure zone within the inlet duct 16 near the rotational axis of the impeller 22, as long as water is being circulated through the pump by powered rotation of the impeller 22, air will be drawn through air line 6 and air passage 28 within pump regulation valve control knob 24 down through the axial opening 29 in shaft 19 and out through the bottom open end of shaft 19 and then back through the internal grooves 20 of hub portion 18 for discharge through the flow passages 25 of valve 12 adjacent the axial inner end of the hub portion 18 to oxygenate the water drawn into the pump for circulation. Thus the amount of air mixed with the water in the pump corresponds to the selected water pumping rate of the pump.

The rate at which water is pumped through the contact column 2 is adjusted by turning the control knob 24 to adjust the discharge flow from the pump P in small increments, either more or less, as necessary until the dense area of fine bubbles B almost fills the contact column. When properly adjusted, some fine bubbles will escape through the bottom discharge opening 9, but the amount should not be excessive.

It is also possible to change the amount of oxygen being mixed with the water in the pump by changing, more or less, the size of the air passage 28 in valve control knob 24. Accordingly, the quantity and size of the bubbles generated in the aerated water flow from the pump P at discharge nozzle 8 into contact column 2 is regulated and selected by a single adjustment of the control knob 24 to achieve a desired small air bubble size and quantity, in combination with an optimum water flow to maximize air/water contact within the contact column. Accurate, reproducible flow adjustment permits fine tuning of the skimmer assembly efficiency to suit a wide range of conditions in the aquarium.

The proper initial flow rate may vary significantly, depending on conditions in the aquarium. Aquariums with high organic levels may require a relatively low initial flow rate to prevent excessive flow of air bubbles into the aquarium. It may also be necessary to slightly adjust the level of the skimmer assembly in the aquarium to maximize efficiency. After the initial high concentration of dissolved organic waste is removed, flow may be increased to improve efficiency and remove wastes at increasingly lower concentrations.

As schematically illustrated in FIG. 2, the discharge of aerated water from discharge nozzle 8 into contact column 2 contains many small air bubbles which, while rising within the column, remain in contact with the continuous downward flow of water to hydrophilically attract surface active protein deposits in the water, carrying such deposits to the water surface $L_2$ in the column to form a deposit containing foam F. Aerated water pumped into contact column 2 exits the contact column through the side discharge port 9 at the bottom of contact column 2 thereby continuously oxygenating the water within the aquarium.

Contact column 2 desirably extends downwardly substantially to the bottom of the tank A to maximize the amount of air introduced into the column for a given size tank. By this construction, a large volume of water is continuously circulated through the contact column substantially equal to the depth of the tank in the presence of a continuous ample supply of small air bubbles.

The contact column 2 of the present invention is made up of four separate tube sections or chambers that are frictionally connected together for ease of assembly and disassembly to facilitate cleaning as described hereafter. FIGS. 1 and 2 schematically illustrate the manner in which the water discharge nozzle 8 of pump P is connected to the pump interface chamber 30 of contact column 2 approximately at and slightly below the aquarium water surface level $L_1$. When aerated water is injected into contact column 2 by pump P, the water surface level $L_2$ within the contact column is raised above the aquarium water surface level $L_1$ (see FIG. 2). This produces a relatively still water surface area within the contact column above the point at which aerated water is injected into the column by the pump P. By this arrangement, surfactant containing foam F which accumulates on the water surface $L_2$ within the contact column is not disrupted by the continuous pumped introduction of water into the column. Also, injecting water into the contact column 2 below the water surface level $L_2$ within the contact column minimizes surface turbulence within the contact column so as not to disrupt foam formation at the water surface level $L_2$, while creating sub-surface turbulence which promotes bubble formation.

As best seen in FIG. 2, the outermost end 31 of water discharge nozzle 8 terminates within an external water intake port 32 on pump interface chamber 30 of contact column 2, rather than protruding into the internal volume of pump interface chamber 30. This provides for smoother continuous introduction of aerated water into the contact column 2. Also, the width of the opening 33 in the intake port 32 which receives the water discharge nozzle 8 is desirably somewhat greater than the outer diameter of the pump interface chamber 30, whereby the opening 34 in the water discharge nozzle 8 may have a width substantially equal to the inner diameter of the pump interface chamber 30. By this arrangement, a relatively wide water introduction flow (having a width substantially equal to the internal diameter of pump interface chamber 30) is created within the contact column 2, creating a type of laminar flow which promotes the foam fractionation process. A discharge nozzle gasket 35 within the interior of the water intake port 32 of pump interface chamber 30 forms a watertight seal about the outer end 31 of water discharge nozzle 8.

The pump P and contact column 2 are assembled together by inserting the pump discharge nozzle 8 into the opening 33 in water intake port 32 and engaging the pump body 5 against a pump support flange 37 extending radially outwardly from the pump interface chamber 30 in vertically aligned, spaced relation below the water inlet port 32. The contact column 2 and pump P are releasably secured together in assembled relation as by means of a securement strap or band 38 that extends around the pump interface chamber 30 and pump head 39. The band 38 is received in a groove 40 extending around the back and lateral sides of the water intake port 32 to prevent the band from sliding up or down along the pump interface chamber 30. The portion of the band wrapped around the periphery of the pump head 39 can easily be slid upward off the pump head to allow disengagement of the discharge nozzle 8 from the intake port 32 to remove the pump P for cleaning of the assembly. Pump support flange 37 has a width slightly greater than the outer diameter of the pump interface chamber 30 for increased structural strength.

Figure 4:
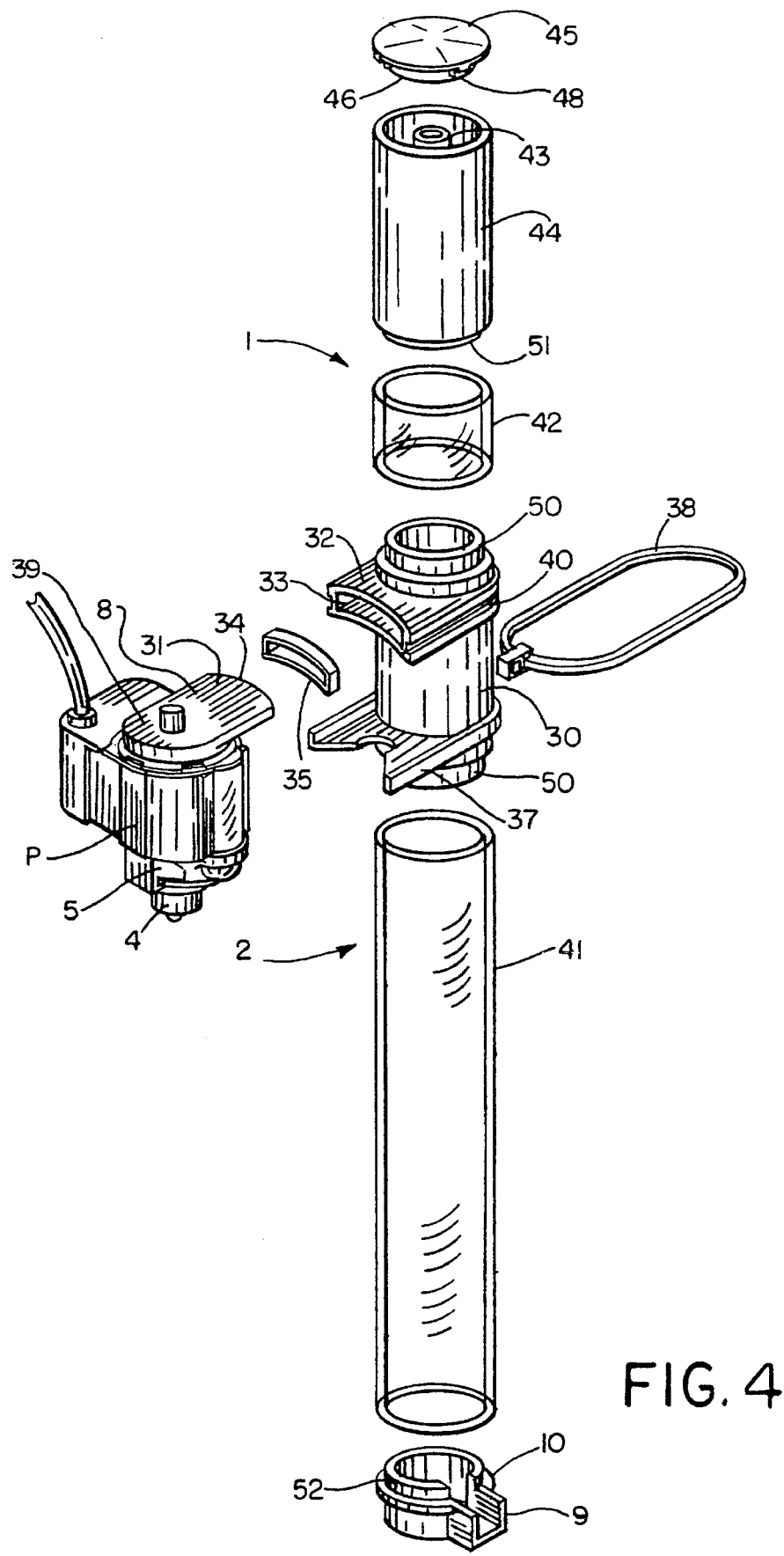
FIG. 4 is an exploded perspective view of the contact column of the foam fractionation protein skimmer assembly of FIGS. 1 and 2.

With further reference to FIG. 2 and also to FIGS. 1 and 4, removably attached to the bottom of the pump interface chamber 30 is a contact chamber 41 which extends downward from pump interface chamber 30 and terminates near the bottom of the tank or aquarium A. The length of the contact chamber 41 may be shortened by cutting for installation in tanks of lesser depth. The contact chamber 41 is desirably constructed of clear plastic to allow for visual verification of the desired bubble formation and bubble/water counterflow within contact column 2.

Within the contact chamber 41 dissolved organic compounds attach themselves to the surfaces of the bubbles which rise slowly within the contact chamber 41 because of the downward flow of water against the rising bubbles holding the rising bubbles in suspension. This countercurrent action increases the air bubble/water contact time and improves efficiency.

Bubbles B rising through the contact chamber 41 and pump interface chamber 30 break the water surface level $L_2$ within the pump interface chamber 30 above the inlet point 32 of water discharge nozzle 8 and water surface level $L_1$ in the aquarium tank to form a surfactant-containing foam F in a foam concentration chamber 42 removably attached to the upper end of the pump interface chamber 30.

Foam concentration chamber 42 is also desirably constructed of clear plastic to allow for visual verification of foam accumulation therein, which occurs when the waste-laden bubbles break the water surface level $L_2$ within the pump interface chamber 30 and the dissolved organic compounds separate from the water to produce layers of a concentrated foam mixture of waste products.

As the foam F continues to build up within the foam concentration chamber 42, it is forced upward through a central lift tube 43 of a foam collection cup 44 removably attached to the upper end of the foam concentration chamber 42. The foam accumulates in the foam collection cup 44 until it is discarded. A cap 45 fits removably on top of the foam collection cup 44 to cause the accumulated foam to remain in the cup while allowing air to escape from the column as described hereafter.

Cap 45 includes a concentric drip ring 46 extending downwardly from the bottom surface 47 of the cap that fits within the upper open end of the collection cup 44 as schematically shown in FIG. 2 to allow bubbles that are pushed up against the cap to burst, and foam and water to run down the inside of the ring 46 and drip back into the cup without running down the outside of the cup.

The outer diameter of the ring 46 is somewhat less than the inner diameter of the cup 44 as shown. Also, spaced apart stepped ribs 48 on the bottom surface of the cap radially outwardly of the ring 46 prevent the cap from sealing against the upper edge of the cup thus providing a clearance space 49 between the cap and cup, for venting of air from the cup.

Preferably the foam collection cup 44 and cap 45 are made of a dark colored opaque material to hide the unsightly collected wastes and keep light out, discouraging bacterial and algae growth in the cup. In such case, the presence of foam within the cup is confirmed by periodically removing the cap from the cup to observe the level of foam that has been collected. The cup should be removed and emptied as necessary and rinsed thoroughly before replacing it on the upper end of the foam concentration chamber 42.

It will be appreciated from FIGS. 2 and 4 that each of the various components of the contact column 2, including particularly the pump interface chamber 30, contact chamber 41 and associated bottom end cap 10, foam concentration chamber 42, foam collection cup 44 and associated lid or cover 45 are easily assembled and disassembled for ease of cleaning by providing overlapping frictional engagement between adjacent parts. Both the contact chamber 41 and foam concentration chamber 42 are desirably made of relatively inexpensive smooth wall clear plastic cylindrical tubing for ease of cleaning and to allow visual verification of the desired bubble formation and bubble/water counterflow in the contact chamber and foam accumulation in the foam concentration chamber.

The wall of the pump interface chamber 30 is relatively thick compared to the walls of the contact chamber 41 and foam concentration chamber 42 and has external stepped flanges 50 on both ends as shown in FIGS. 2 and 4 for sliding receipt of the contact chamber 41 and foam concentration chamber 42 over such flanges which are also tapered to produce a friction fit with the ends of the contact chamber and foam concentration chamber inserted thereover.

The cup 44 may be retained in place on the foam concentration chamber 42 by providing an inwardly stepped flange 51 on the bottom of the cup which is tapered to produce a friction fit in the upper end of the foam concentration chamber 42. The end cap 10 at the bottom of the contact chamber 41 has an external stepped flange 52 which is tapered to produce a friction fit within the bottom end of the contact chamber.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. An apparatus for removing organic waste material from water within an aquarium comprising an air/water contact column having plural chambers including a pump interface chamber having an external water intake port extending outwardly from said pump interface chamber, a contact chamber below said pump interface chamber having a bottom water outlet opening, and a foam concentration chamber above said foam interface chamber, a foam collection cup removably attached to an upper end of said foam concentration chamber, said water intake port having an opening of a width greater than the external width of said pump intact chamber, and an aerating water pump having a water discharge nozzle inserted into said opening in said external water intake port, said water discharge nozzle having a water discharge opening of a width substantially equal to the internal width of said pump interface chamber, said water discharge nozzle having an outer end terminating within said water intake port outwardly of the interior of said pump interface chamber, said aerating water pump including a pumping chamber, a water intake to said pumping chamber, means for controlling the water flow through said water intake into said pumping chamber, and means for supplying air to said water intake which varies in proportion to the water flow through said water intake.

2. The apparatus of claim 1 wherein said means for supplying air to said water intake comprises hollow shaft means communicating with said water intake, said shaft means extending above said pump to provide for the passage of air down through said shaft means for mixing with the water within said pump.

3. The apparatus of claim 2 wherein said means for controlling the water flow rate through said water intake comprises valve means in said pump operable by rotation of said shaft means.

4. The apparatus of claim 1 wherein said contact chamber, said foam concentration chamber, and said pump interface chamber are made of separate members assembled together to form said contact column, said contact chamber and said foam concentration chamber having friction fits with opposite ends of said pump interface chamber for ease of assembly and disassembly of said contact column for cleaning.

5. The apparatus of claim 4 wherein said contact chamber and said foam concentration chamber are made of smooth wall cylindrical tubing, and the ends of said pump interface chamber have external stepped flanges which are tapered for frictionally retaining said contact chamber and said foam concentration chamber thereon.

6. The apparatus of claim 5 wherein said contact chamber and said foam concentration chamber are transparent.

7. The apparatus of claim 5 wherein said foam collection cup has an external bottom flange which is tapered to provide a friction fit with an upper end of said foam concentration chamber, said foam collection cup and said foam concentration chamber having outer diameters which are substantially the same and are in axial alignment with each other.

8. The apparatus of claim 5 further comprising an end cap on the bottom end of said contact chamber, said end cap having a water discharge port extending radially outwardly therefrom, said end cap being rotatably adjustable relative to said contact chamber for directing the water discharge from said contact chamber in any desired direction, said end cap having an external stepped flange which is tapered to provide a friction fit within the bottom end of said contact chamber.

9. The apparatus of claim 1 wherein said foam collection cup has a removable vented cap, said cap having a concentric ring extending downwardly into said cup to prevent foam that enters said cup from flowing down the outside of said cup.

10. The apparatus of claim 9 further comprising spaced apart stepped ribs on a bottom surface of said cap radially outwardly of said ring which prevent said cap from sealing against said cup thus providing a clearance space between said cap and said cup for venting air from said cup.

11. An apparatus for removing organic waste material from water within an aquarium comprising an air/water contact column, said contact column having a water intake port extending outwardly from said contact column and a water discharge port, a foam discharge at an upper end of said contact column, and aerating pump means having a water discharge nozzle inserted into said water intake port, said water intake port having an opening for receipt of said water discharge nozzle of a width greater than the external width of said contact column, and said water discharge nozzle having a water discharge opening of a width substantially equal to the internal width of said contact column, said water discharge nozzle having an outer end terminating within said water intake port outwardly of the interior of said contact column.

12. The apparatus of claim 11 further comprising a band for removably securing said pump to said contact column.

13. An apparatus for removing organic waste material from water within an aquarium comprising an air/water contact column having a water intake port and a water discharge port, a foam discharge at an upper end of said contact column, an aerating pump having a water discharge nozzle communicating with said water intake port, a band for removably securing said pump to said contact column, and a pump support flange extending outwardly from said contact column in axial spaced relation to said water inlet port, said pump being held against said flange by said band.

14. The apparatus of claim 13 wherein said contact column has an external groove for receipt of a portion of said band, and said pump has a pump head about which said band is slidably engaged.

15. In combination, an aquarium, and apparatus for removing organic waste material from water within the aquarium, said apparatus comprising an air/water contact column partially submerged in the water in the aquarium, said contact column having a water intake port, said contact column being positioned within the aquarium with said water intake port approximately at the surface of the water in the aquarium, said contact column extending downwardly below the water surface in the aquarium and having a bottom water discharge opening, said contact column also extending above the water surface in the aquarium, and aerating water pump means having a water discharge nozzle communicating with said water intake port, said aerating water pump means including means for injecting an air/water mixture into said contact column through said water intake port for providing a counterflow of water and air bubbles within said contact column between said water intake port where the air/water mixture enters said contact column approximately at the surface of the water in the aquarium and said bottom water discharge opening in said contact column through which the water flows back into the aquarium, the air bubbles within said contact column rising from approximately adjacent said bottom water discharge opening to a water surface level within said contact column which is above the water surface level in the aquarium, a foam discharge at an upper end of said contact column, and means for controlling the amount of air/water mixture injected into said contact column by said pump means, said contact column has plural chambers including a pump interface chamber containing said water intake port, a contact chamber below said pump interface chamber containing said bottom water discharge opening, and a foam concentration chamber above said pump interface chamber, and a foam collection cup above said foam concentration chamber; said foam interface chamber, said contact chamber, said foam concentration chamber, and said foam collection cup each defining separate tube sections and being frictionally connected together for ease of assembly and removal for cleaning, each of said chambers and said foam collection cup having outer diameters which are substantially the same and are in axial alignment with each other.

16. The combination of claim 15 wherein said contact column extends downwardly substantially the full depth of the water in the aquarium, said contact column having an end cap on a bottom end thereof, said end cap having a water discharge port extending radially outwardly therefrom providing said bottom water discharge opening, said end cap being rotatably adjustable relative to said contact column for directing the water discharge from said contact column in any desired direction, said end cap having an external stepped flange which is tapered to provide a friction fit within the bottom end of said contact chamber.

17. The combination of claim 15 wherein said contact column extends downwardly substantially the full depth of the water in the aquarium.

18. The combination of claim 15 wherein said contact chamber and said foam concentration chamber are made of smooth wall cylindrical tubing, and said pump interface chamber has external stepped flanges at opposite ends which are tapered for frictionally retaining said contact chamber and said foam concentration chamber on said ends.

19. The combination of claim 18 wherein said contact chamber and said foam concentration chamber are transparent.

20. The combination of claim 15 wherein said foam collection cup is made of an opaque material, said cup having an upper end which is covered by a removable vented cap, said cap having a concentric ring extending downwardly into said cup to prevent foam that enters said cup from said foam concentration chamber from flowing down the outside of said cup.

21. The combination of claim 20 further comprising spaced apart stepped ribs on a bottom surface of said cap radially outwardly of said ring which prevent said cap from sealing against said cup thus providing a clearance space between said cap and said cup for venting air from said cup.

22. An apparatus for removing organic waste material from water within an aquarium comprising an air/water contact column having plural chambers including a pump interface chamber having a water intake port, a contact chamber below said pump interface chamber having a bottom water outlet opening, and a foam concentration chamber above said foam interface chamber, a foam collection cup removably attached to an upper end of said foam concentration chamber, an aerating water pump having a water discharge nozzle inserted into said water intake port of said contact column, said aerating water pump including a pumping chamber, a water intake to said pumping chamber, means for controlling the water flow through said water intake into said pumping chamber, and means for supplying air to said water intake which varies in proportion to the water flow through said water intake, and a band for removably securing said pump to said contact column, said pump interface chamber having an external groove for receipt of a portion of said band, and said pump having a pump head about which said band is slidably engaged.

23. An apparatus for removing organic waste material from water within an aquarium comprising an air/water contact column having plural chambers including a pump interface chamber having a water intake port, a contact chamber below said pump interface chamber having a bottom water outlet opening, and a foam concentration chamber above said foam interface chamber, a foam collection cup removably attached to an upper end of said foam concentration chamber, an aerating water pump having a water discharge nozzle inserted into said water intake port of said contact column, said aerating water pump including a pumping chamber, a water intake to said pumping chamber, means for controlling the water flow through said water intake into said pumping chamber, and means for supplying air to said water intake which varies in proportion to the water flow through said water intake, a band for removably securing said pump to said contact column, and a pump support flange extending radially outwardly from said pump interface chamber in axially aligned relation below said water inlet port, said pump being held against said flange by said band.

24. An apparatus for removing organic waste material from water within an aquarium comprising an air/water contact column, said contact column having a water intake port extending outwardly from said contact column and a water discharge port, a foam discharge at an upper end of said contact column, aerating pump means having a water discharge nozzle inserted into said water intake port, said water discharge nozzle having an outer end terminating within said water intake port, and a band for removably securing said pump to said contact column, said contact column having an external groove for receipt of a portion of said band, and said pump having a pump head about which said band is slidably engaged.

25. An apparatus for removing organic waste material from water within an aquarium comprising an air/water contact column, said contact column having a water intake port extending outwardly from said contact column and a water discharge port, a foam discharge at an upper end of said contact column, aerating pump means having a water discharge nozzle inserted into said water intake port, said water discharge nozzle having an outer end terminating within said water intake port, a band for removably securing said pump to said contact column, and a pump support flange extending radially outwardly from said contact column in axially aligned relation below said water inlet port, said pump being held against said flange by said band.

\* \* \* \* \*